(12) United States Patent
Neumayer et al.

(10) Patent No.: US 10,554,086 B2
(45) Date of Patent: Feb. 4, 2020

(54) METHOD FOR COOLING THE ROTOR OF AN ELECTRIC GENERATOR

(71) Applicant: ANDRITZ HYDRO GMBH, Vienna (AT)

(72) Inventors: Fritz Neumayer, Graz (AT); Jesus Contreras Espada, Cham (CH)

(73) Assignee: ANDRITZ HYDRO GMBH, Vienna (AT)

( * ) Notice: Subject to any disclaimer, the term of this patent is extended or adjusted under 35 U.S.C. 154(b) by 0 days.

(21) Appl. No.: 16/330,913

(22) PCT Filed: Aug. 10, 2017

(86) PCT No.: PCT/EP2017/070273
§ 371 (c)(1),
(2) Date: Mar. 6, 2019

(87) PCT Pub. No.: WO2018/046219
PCT Pub. Date: Mar. 15, 2018

(65) Prior Publication Data
US 2019/0214870 A1    Jul. 11, 2019

(30) Foreign Application Priority Data

Sep. 6, 2016 (AT) .............................. A 50788/2016

(51) Int. Cl.
*H02K 3/24* (2006.01)
*H02K 7/18* (2006.01)
(Continued)

(52) U.S. Cl.
CPC .............. *H02K 3/24* (2013.01); *F03B 13/10* (2013.01); *H02K 1/32* (2013.01); *H02K 7/003* (2013.01);
(Continued)

(58) Field of Classification Search
CPC ...... F03B 13/10; H02K 7/003; H02K 7/1823; H02K 9/19; H02K 3/24
(Continued)

(56) References Cited

U.S. PATENT DOCUMENTS 2,321,882 A * 6/1943 Wallace ................ F01P 3/2271
                                                    123/41.23
3,198,994 A * 8/1965 Hildebrandt .............. H01F 6/00
                                                    335/216
(Continued)

FOREIGN PATENT DOCUMENTS

CN     203445772 U  *  2/2014
DE        10259047 A1    10/2003
(Continued)

OTHER PUBLICATIONS

International Seach Report, prepared by the European Patent Office, for PCT/EP2017/070273, dated Feb. 2, 2018, 2 Pages.

*Primary Examiner* — Charles Reid, Jr.
(74) *Attorney, Agent, or Firm* — Brooks Kushman P.C.

(57) ABSTRACT

A liquid cooling method for a hydroelectric generator which cools the winding of the rotor via a primary cooling liquid circuit, the cooling liquid being maintained in the circuit by the produced centrifugal force. The dissipation of the thermal energy takes place via a secondary cooling liquid which flows once vertically through the system. Accordingly, the thermal exchange takes place via a co-rotating heat exchanger in the center of the rotor. A device for carrying out such a method is also disclosed.

11 Claims, 2 Drawing Sheets

Figure 1:
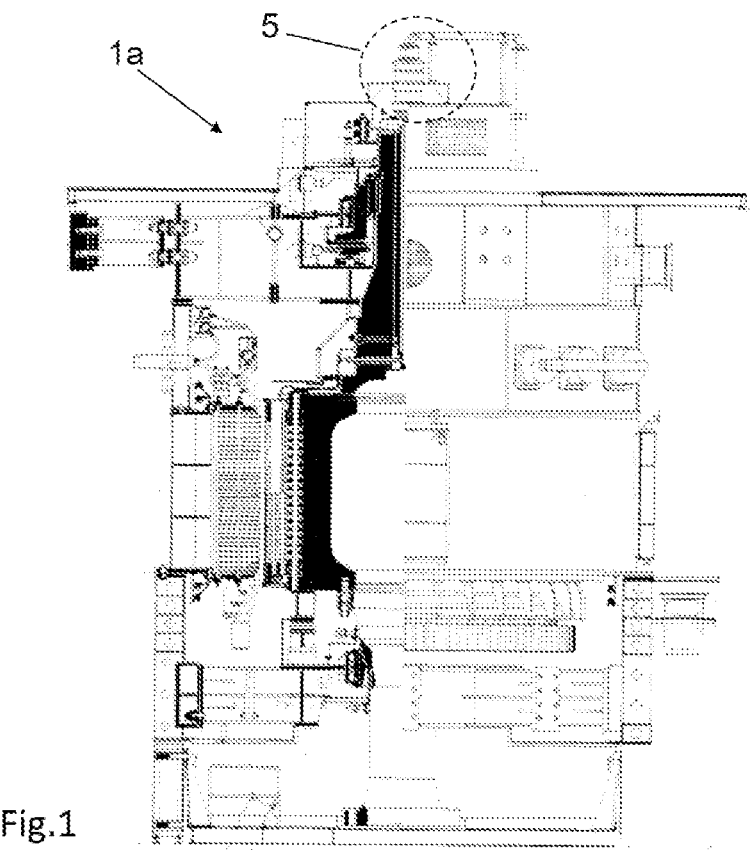

(51) Int. Cl.
  *H02K 9/19* (2006.01)
  *H02K 1/32* (2006.01)
  *H02K 9/197* (2006.01)
  *F03B 13/10* (2006.01)
  *H02K 7/00* (2006.01)

(52) U.S. Cl.
  CPC ............ *H02K 7/1823* (2013.01); *H02K 9/19* (2013.01); *H02K 9/197* (2013.01)

(58) Field of Classification Search
  USPC .......................................... 290/1 A, 2, 43, 54
  See application file for complete search history.

(56) References Cited

U.S. PATENT DOCUMENTS

| | | | |
|---|---|---|---|
| 3,390,667 A * | 7/1968 | Beurtheret | F01C 19/10 418/61.3 |
| 3,571,634 A * | 3/1971 | Sato | H02K 9/193 310/54 |
| 3,752,132 A * | 8/1973 | Bentz | F01P 7/165 123/563 |
| 4,625,789 A * | 12/1986 | Chaix | F28D 7/0008 165/11.1 |
| 5,453,573 A * | 9/1995 | Callas | F02F 1/40 123/41.28 |
| 2003/0132673 A1 | 7/2003 | Zhou et al. | |
| 2007/0228736 A1 * | 10/2007 | Smushkovich | F03B 13/1845 290/42 |
| 2012/0192557 A1 * | 8/2012 | Johnson | F01D 17/105 60/599 |
| 2012/0285402 A1 * | 11/2012 | Foster | F01D 17/02 123/41.12 |

FOREIGN PATENT DOCUMENTS

| | | |
|---|---|---|
| DE | 10 2013 214082 A1 | 1/2015 |
| EP | 0 461 905 A2 | 12/1991 |
| EP | 2916438 A1 | 9/2015 |
| GB | 1482411 A | 8/1997 |
| JP | 2007085309 A * | 4/2007 |

* cited by examiner

METHOD FOR COOLING THE ROTOR OF AN ELECTRIC GENERATOR

CROSS-REFERENCE TO RELATED APPLICATION

This application is the U.S. national phase of PCT Application No. PCT/EP2017/070273 filed on Aug. 10, 2017, which claims priority to AT Patent Application No. A50788/2016 filed on Sep. 6, 2016, the disclosures of which are incorporated in their entirety by reference herein.

This invention relates to a liquid cooling method for a hydroelectric generator which is designed as an electric synchronous machine with a rotor and a stator, with poles on the rotor that are formed by the pole winding.

As a result of the participation of solar and wind energy in the electricity grid, the requirements for current-producing grid participants change. Due to the high volatility that arises in the electric grid because of these technologies, a high number of start-stop cycles and load changes are demanded from the conventional producers, for example hydroelectric plants having large drop heights.

The construction of very large, high-speed hydroelectric generators is problematic. Since limits for the maximum rotor mass are given for various reasons, the maximally achievable power depends on the efficiency of the cooling. Rotors of this type are therefore generally provided with liquid cooling/water cooling. A rotor with liquid cooling is disclosed, for example, in EP 0 461 905 A2.

On account of the very low ventilation losses, water-cooled hydroelectric generators are better suited for the idle mode and for reactive power generation where the ventilation losses make up a large portion of the driving power.

The number of mechanical load cycles and also wear of bearings and brakes can be reduced if the machine units rotate continuously.

However, conventional water cooling of the rotor winding is more complicated and expensive than simple air cooling.

Customarily, in known liquid cooling systems, the cooling medium is conducted into a circuit between machine interior (rotor or heat source) and machine exterior (cooler or heat sink) which, especially when the liquid inflows and outflows are connected to the hollow rotor shaft in complex structures. The cooling liquid is supplied and removed here via the upper end of the hollow rotor shaft, with pumps being required for circulating the cooling liquid. These complex structures lead in turn to a high outlay on maintenance in the running mode of the power plant.

Figure 2:
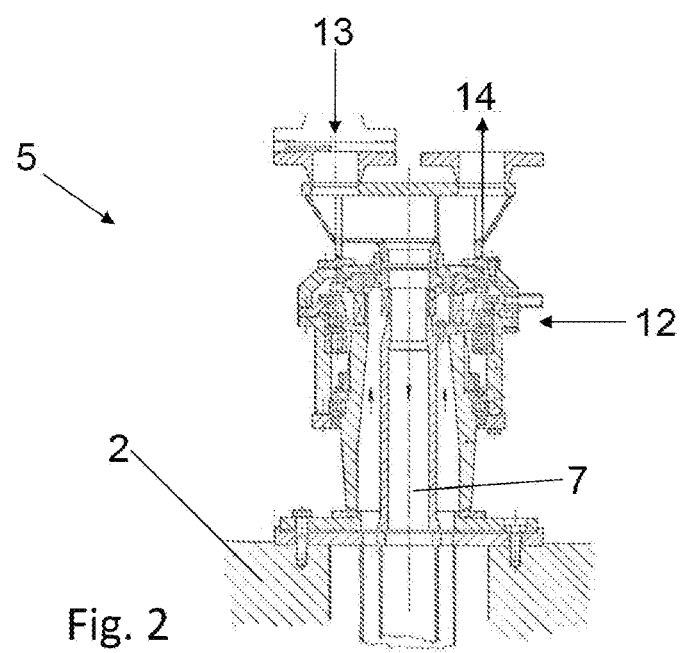

Such water cooling of the rotor winding according to the prior art has been used for several decades, for example, in the Haüsling pumped storage plant in Tyrol, Austria. Such a water supply head according to the prior art is illustrated in FIG. 1 and FIG. 2.

DE 10 2013 214 082 A1 discloses an electric pod drive for a ship. DE 10 2013 214 082 A1 at the same time discloses a method for cooling a rotor which has rotor windings and is surrounded by a stator. A closed cooling circuit for a primary liquid is provided in the rotor, wherein the primary liquid is supplied to a co-rotating heat exchanger. The primary liquid is conveyed here by the centrifugal forces occurring during operation. The hollow rotor shaft is passed through by a secondary liquid to which the primary liquid outputs the heat absorbed from the rotor windings with the aid of the co-rotating heat exchanger.

Furthermore, rotors cooled with refrigerants are known from the prior art. The rotor here is provided with a refrigerant-vaporization-condensation rotor which, on the condenser side, then outputs the waste heat to, for example, water. By way of example, such a design is described in GB880262. GB989698 describes a similar construction, wherein a stator is cooled here and the heat exchanger/condenser for outputting the heat is arranged here outside the electrodynamic machine. In these two embodiments, a refrigerant is vaporized and condensed. An advantage to be mentioned of these methods is the higher heat capacity of refrigerants in relation to coolants, which is achieved by the phase transition from liquid to gaseous. It is also theoretically possible in methods of this type to operate said methods according to the thermosyphon principle without an additional pump/compressor or to use the centrifugal force in order to spray the refrigerant via nozzles (GB989698).

On account of the physical and chemical prerequisites in a hydroelectric generator and the requirements for environmental and fire protection, the choice of refrigerant is also difficult. Further disadvantages of these methods are the susceptibility of the refrigerant circuits to malfunction in respect of the electrochemical stability of the hollow winding tracks, and ensuring the gastightness of the lines, etc. The associated outlay on production and maintenance appears to be enormous, and therefore systems of this type have not become established in practice.

The invention is therefore based on the object of providing a method for cooling the rotor of a high-speed hydroelectric generator, which combines the efficiency of liquid or refrigerant cooling with the simplicity and low maintenance of air cooling methods.

This object is achieved by a cooling method for the rotor of a hydroelectric generator. According to the invention, this method has a closed primary liquid circuit which absorbs thermal energy and outputs same in the rotor center via heat exchangers to the secondary cooling liquid flowing once through the hollow rotor shaft.

Said secondary liquid flow is preferably an unpressurized fresh water flow which can be extracted, for example, from a reservoir located at the power plant level or from a reservoir located only slightly thereabove, or else simply from the water supply network.

The secondary cooling liquid is preferably removed from the generator via the vertically arranged hollow rotor shaft at the lower end thereof (turbine end) directly into the outflowing plant water which at the same time forms the heat sink in said cooling system.

By means of said "throughflow" arrangement of the secondary cooling liquid flow, the structural outlay is significantly reduced in comparison to currently used systems, in particular in respect of the fluid-conducting connection between the hollow rotor shaft and the heat sink positioned outside the electrodynamic machine.

A hydroelectric generator of this type despite its high power can therefore be operated at relatively high rotational speeds for hydroelectric generators, for example within the range of 400 to 1200 rpm, and can be cooled with liquid without the structural disadvantages of the sealing of the hollow rotor shaft having to be accepted.

The rotor body which is preferably formed from steel rings has feed ducts for the primary cooling liquid, which feed ducts lead in the radial direction from a tubular heat exchanger, which is arranged axially in the center of the hollow rotor shaft, to cooling ducts in the rotor winding. Furthermore, radial return ducts conduct the heated primary cooling liquid back to the rotor center, and therefore the primary cooling liquid describes a closed circuit. Surprisingly, simulations and tests have shown that such a circuit in such high-speed hydroelectric generators can be set into motion and maintained by means of the change in density, which occurs upon heating, of the primary cooling liquid and the centrifugal force field of the rotor. An external pump for separating the primary cooling liquid is therefore not required. This can also be supported if the hydraulic system is formed in a plurality of parallel branches. Further optimizations of said circulation are achieved, for example, by thermal insulation of the feed ducts for the primary cooling liquid until the latter enters the cooling ducts of the rotor winding.

Via the heat exchanger arranged in the interior of the hollow rotor shaft, the primary cooling liquid finally outputs the absorbed thermal energy to the secondary cooling liquid, preferably water, which flows through the hollow rotor shaft from the top downward in the direction of the turbine end and is removed via the outflowing plant water.

The secondary cooling liquid, on its path once through the rotor, therefore absorbs the heat loss and removes same from the system.

Good cooling of the rotor winding thereby occurs.

The invention also relates to the apparatus of a hydroelectric generator, wherein the hydroelectric generator has two coolant flows, wherein the primary cooling liquid forms a circuit which is closed per se, while the secondary cooling liquid flows "once" through the hollow rotor shaft, which is designed as a hollow shaft.

The prior art and an exemplary embodiment of the invention will be described below with reference to drawings. The same reference signs in the individual figures each denote identical plant parts.

In the drawings:

FIG. 1 shows a schematic longitudinal section through a water-cooled hydroelectric generator 1a known from the prior art; the water supply head 5 with inflow and outflow at the upper end of the hollow rotor shaft can be seen here.

FIG. 2 shows a water supply head 5 according to the prior art as a detail from FIG. 1. Cooling water intake 13 and cooling water return 14, and also the design of the rotary feedthrough 12 are illustrated according to the prior art.

Figure 3:
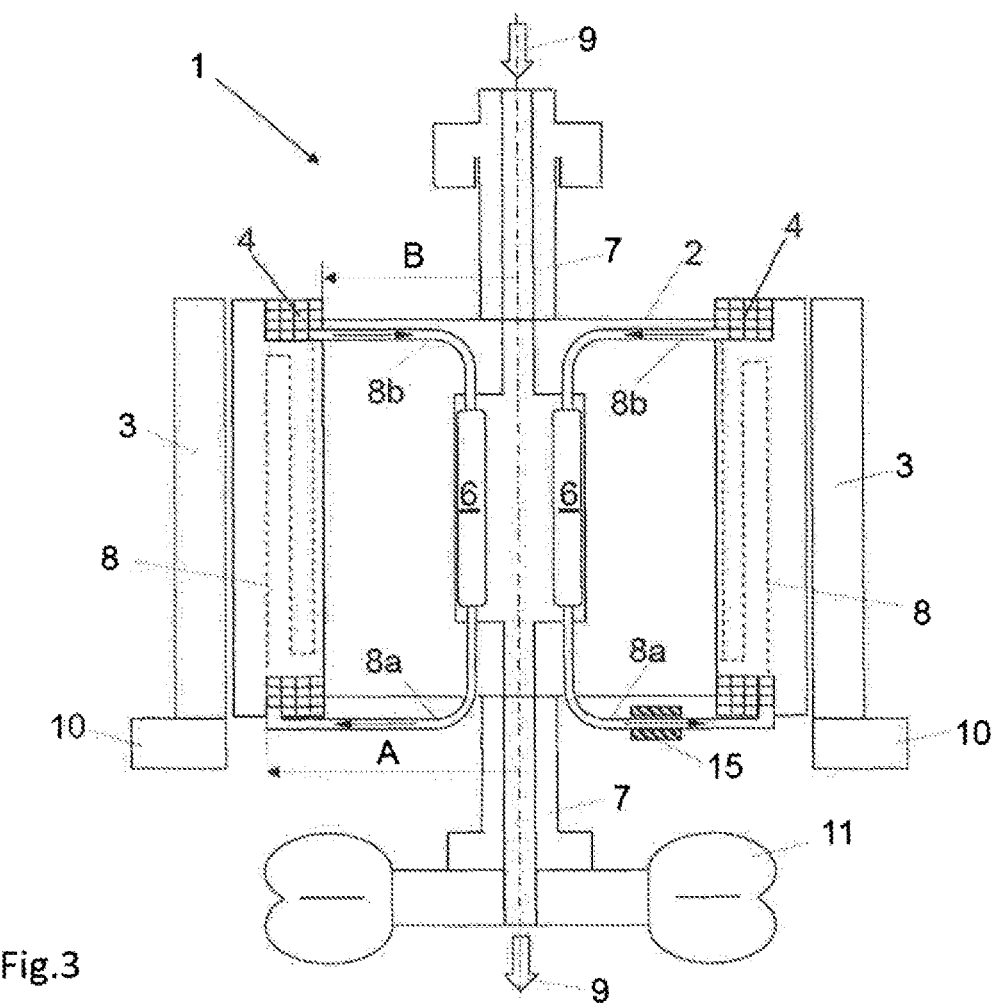

FIG. 3 shows a schematic section through a hydroelectric generator 1 according to the invention, wherein the illustration of the mounting and of other details which are not relevant to the invention has been omitted. The primary liquid circuit in the cooling ducts 8 for the primary cooling liquid and the path of the secondary cooling liquid 9 from the top downward through the system are readily seen. The vertical rotor 2 is located within the stator 3, which rests on a base 10. The "unpressurized" secondary cooling liquid 9 can be guided into the rotor interior via an axial opening in the hollow rotor shaft 7.

Said water supply can be kept very simple since no significant pressures and no back-flowing liquid flow have to be sealed. The secondary cooling liquid 9, preferably water, washes in its further course around the tubular heat exchanger 6 of the primary coolant circuit, said heat exchanger being arranged in the center of the hollow rotor shaft 7 in the direction of the axis of rotation.

Finally, the secondary cooling liquid flow 9 emerges at the turbine-side end of the hollow rotor shaft 7 and leaves the system. The turbine 11 here can be, for example as indicated in FIG. 3, a Pelton turbine which are often used in power plants having large drop heights.

It is furthermore indicated in FIG. 3 that the feed ducts 8a for the primary cooling liquid to the rotor winding can have thermal insulation 15 in a partial region of their length or over the entirety thereof. Thermal insulation at this location prevents undesirable premature heating of the primary cooling liquid on the way to the rotor winding 4. By means of the targeted introduction of the heat into the primary cooling liquid only in the substantially vertical rotor winding 4, the circulation direction of the primary cooling liquid is additionally predetermined since the reduction in density of the heated primary cooling liquid at this location assists the pumping action of the rotation of the system.

Figure 4:
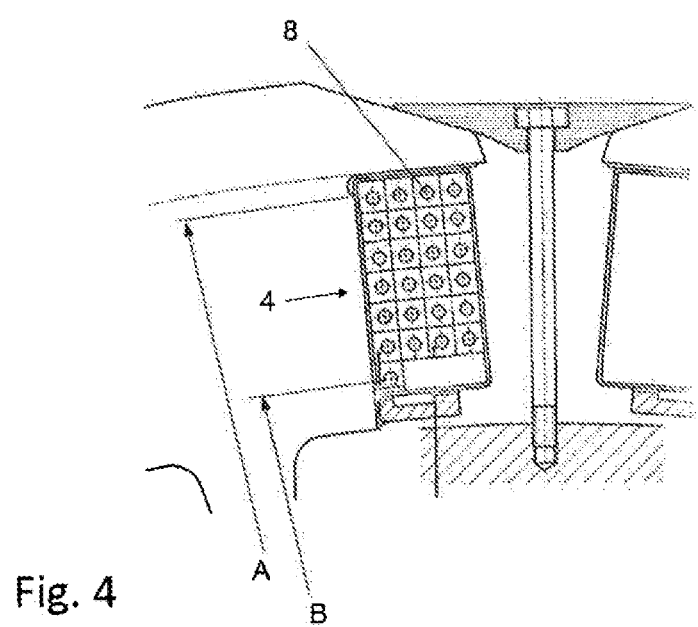

FIG. 4 shows a radial section through part of a rotor winding 4 showing the cooling ducts 8 for the primary cooling liquid and also the radial distances A and B between the feed ducts 8a and return ducts 8b. The primary cooling liquid is preferably, namely as illustrated, supplied to the rotor winding 4 radially further away from the rotor center and removed again radially closer to the rotor center. As a result, the reduction in density of the primary cooling liquid is further positively influenced by increased heating of same in the upper part of the rotor winding.

The invention claimed is:

1. A method for cooling the rotor of a high-speed electric hydroelectric generator with a vertical rotor- and a stator surrounding the rotor, which rests on a base, wherein the rotor has rotor windings which are provided with cooling ducts for the passage of a primary cooling liquid, wherein there is a closed cooling circuit for the primary cooling liquid in the rotor, wherein the primary cooling liquid coming from a co-rotating heat exchanger running in the axial direction is supplied via substantially radially running feed ducts located at the bottom to the cooling ducts in the rotor windings and is removed via further substantially radially running return ducts located at the top from the cooling ducts and is supplied again to the co-rotating heat exchanger, wherein the primary cooling liquid is conveyed by the centrifugal forces occurring during operation through the cooling ducts from the bottom upward, and wherein a hollow rotor shaft is passed through by a secondary cooling liquid to which the primary cooling liquid outputs the heat absorbed from the rotor windings with the aid of the co-rotating heat exchanger, wherein the secondary cooling liquid is introduced at the upper end of the hollow rotor shaft and is discharged at the lower end of the hollow rotor shaft.

2. The method as claimed in claim 1, wherein the secondary cooling liquid leaves a unit comprised of a generator and a turbine through the hollow rotor shaft via an outflowing plant water from the turbine.

3. The method as claimed in claim 2, wherein there are a plurality of parallel cooling ducts for cooling the rotor winding.

4. The method as claimed in claim 2, wherein the supply of the primary cooling liquid to the rotor winding takes place at a point radially further away from the rotor center than the removal of the primary liquid in the direction of the co-rotating heat exchanger.

5. The method as claimed in claim 2, wherein an electrically non-conductive liquid is used as the primary cooling liquid.

6. The method as claimed in claim 1, wherein there are a plurality of parallel cooling ducts for cooling the rotor winding.

7. The method as claimed in claim 6, wherein the supply of the primary cooling liquid to the rotor winding takes place at a point radially further away from the rotor center than the removal of the primary liquid in the direction of the co-rotating heat exchanger.

8. The method as claimed in claim 6, wherein an electrically non-conductive liquid is used as the primary cooling liquid.

9. The method as claimed in claim 1, wherein the supply of the primary cooling liquid to the rotor winding takes place at a point radially further away from the rotor center than the removal of the primary liquid in the direction of the co-rotating heat exchanger.

10. The method as claimed in claim 9, wherein an electrically non-conductive liquid is used as the primary cooling liquid.

11. The method as claimed in claim 1, wherein an electrically non-conductive liquid is used as the primary cooling liquid.

\* \* \* \* \*